United States Patent [19]
Taniyama et al.

[11] 4,396,644
[45] Aug. 2, 1983

[54] PROCESS FOR PRODUCING AROMATIC POLYCARBONATE FORMED ARTICLES HAVING COATING LAYER WITH EXCELLENT SURFACE PROPERTIES

[75] Inventors: Susumu Taniyama, Toyonaka; Goro Shimaoka, Sakai; Yukio Maeda, Toyonaka; Masuya Ikegami, Chigasaki, all of Japan

[73] Assignee: Mitsubishi Gas Chemical Company, Inc., Tokyo, Japan

[21] Appl. No.: 362,261

[22] Filed: Mar. 26, 1982

[30] Foreign Application Priority Data

Mar. 30, 1981 [JP] Japan ................................ 56-47005

[51] Int. Cl.³ .................... B05D 1/36; B29D 9/00; B32B 27/30; B32B 27/36
[52] U.S. Cl. .................................. 427/160; 427/387; 427/412.5
[58] Field of Search ...................... 427/160, 387, 412.5

[56] References Cited

U.S. PATENT DOCUMENTS

| 3,707,397 | 12/1972 | Gagnon | 427/387 X |
| 4,224,378 | 9/1980 | Schroeter et al. | 428/412 X |
| 4,239,798 | 12/1980 | Schroeter et al. | 428/160 X |
| 4,298,632 | 11/1981 | Schroeter et al. | 428/160 |

Primary Examiner—James R. Hoffman
Attorney, Agent, or Firm—Browdy & Neimark

[57] ABSTRACT

A process for producing a coated aromatic polycarbonate formed article having improved surface properties which comprises forming a primer layer containing a specific thermoplastic acrylic copolymer and an ultraviolet light absorbent on an aromatic polycarbonate formed article, and forming a protective topcoat comprising a thermoset organopolysiloxane on said primed polycarbonate article is disclosed. The coated aromatic polycarbonate formed article has excellent surface properties, such as weather resistance.

6 Claims, No Drawings

PROCESS FOR PRODUCING AROMATIC POLYCARBONATE FORMED ARTICLES HAVING COATING LAYER WITH EXCELLENT SURFACE PROPERTIES

BACKGROUND OF THE INVENTION

The present invention relates to a process for producing a weather-resistant aromatic polycarbonate formed article with a coat having good surface properties such as high surface hardness. More particularly, the invention relates to a process for producing an aromatic polycarbonate formed article comprising forming a primer layer of a thermoplastic acrylic polymer on the surface of an aromatic polycarbonate formed article, then forming on said primer layer a protective topcoat comprised of cured organopolysiloxane.

Aromatic polycarbonates are transparent, lightweight, have good mechanical properties and are easily machinable. Because of these features, the aromatic polycarbonate is used in a structural member instead of glass, and for many other purposes. But as compared with metals and glass, the aromatic polycarbonate has low surface hardness, wear resistance, abrasion resistance and solvent resistance, and to expand its use, improving the surface properties of an aromatic polycarbonate formed article has been strongly needed.

Several attempts have been made to improve the surface properties of an aromatic polycarbonate formed article by coating a paint on the surface of the formed article to form a protective coat thereon. According to one method, a thermosettable melamine resin paint is applied to the polycarbonate formed article and heat-curing the same to form a protective coat. In another method, a polyfunctional acrylic compound is applied and cured by exposure to ultraviolet rays to form a protective coat. In still another method, a hydrolyzate of carbon-functional silane compound is applied and cured to form a protective coat comprised of organopolysiloxane. But the protective coat formed by each of these methods does not have a strong bond to the polycarbonate substrate, and it does not have satisfactory durability.

The cured organopolysiloxane layer provides good surface properties, but it does not have intimate contact with the polycarbonate substrate, and several methods have been proposed to provide improved intimate contact by treating the surface of the polycarbonate substrate before forming the protective coat. In one method, a paint containing a thermoplastic acrylic polymer is used as a surface treating agent [e.g. Japanese Patent Publication (Kohkai) No. 13856/77, and U.S. Pat. No. 4,224,378]. In another method, a paint containing a thermosettable acrylic polymer is used (e.g. U.S. Pat. No. 3,707,397). In still another method, a paint containing a bisphenol-type epoxy resin is used [Japanese Patent Publication (Kohkai) No. 40743/80].

As is well known, a layer made of cured organopolysiloxane is preferred as a coat having good surface properties, and many proposals have been made on the paint that provides a cured organopolysiloxane. But if a carbon functional silane compound is used as a paint, hostile curing conditions are necessary and a coating layer having optimum surface properties is hard to obtain, and one fatal defect is poor weather resistance. If a silicone functional silane compound is used, mild curing conditions can be used and the resulting coating layer has high weather resistance and better suits practical purposes. But the cured organopolysiloxane resulting from the silicone-functional silane compound usually has weak bonding power, so, to form a desired protective coat on the polycarbonate substrate, careful consideration is necessary with respect to the optimum combination of silicone-functional silane compound, surface treating agent and solvent.

The present invention provides a process for forming a coating layer with good surface properties on a polycarbonate formed article using a curable organopolysiloxane prepared by hydrolyzing a silicone functional silane compound. More particularly, the invention relates to a weather-resistant polycarbonate formed article having improved contact between the cured organopolysiloxane layer and polycarbonate substrate.

As described before, attempts have been made to use an acrylic polymer interlayer to increase the intimacy of contact between the cured organopolysiloxane layer and the polycarbonate substrate. The present inventors have made further studies on the use of a paint containing an acrylic polymer to form a primer layer on the polycarbonate substrate, and found that if a cured organopolysiloxane layer made of a silicone-functional silane compound is formed on a primer layer made of the commonly employed thermoplastic acrylic polymer, the resulting topcoat does not have the desired surface properties, especially high wear resistance.

SUMMARY OF THE INVENTION

The present inventors did research to find a primer layer having good properties. As a result, we found that a primer layer comprising an ultraviolet light absorbent and a copolymer of an alkyl methacrylate and an alkyl acrylate has excellent properties.

One object of this invention is to provide an aromatic polycarbonate formed article having excellent surface properties, such as weather resistance.

The present invention relates to a process for producing an aromatic polycarbonate formed article having improved surface properties which comprises forming a primer layer comprising a thermosplastic acrylic copolymer and an ultraviolet light absorbent on an aromatic polycarbonate article, and forming a protective topcoat comprising a cured organopolysiloxane on said primer layer, characterized in that said acrylic copolymer is a copolymer of an alkyl methacrylate and an alkyl acrylate (sometimes hereinunder referred to as acrylic copolymer) having an average molecular weight of above 50,000, which is determined from top peak of gel permeation chromatograph.

DETAILED DESCRIPTION OF THE INVENTION

Preferably, the acrylic copolymer of the present invention comprises 70–90 wt% of the alkyl methacrylate and 30–10 wt% of the alkyl acrylate, and the most preferred acrylic copolymer is one comprising 80–85 wt% of the alkyl methacrylate and 15–20 wt% of the alkyl acrylate. The primer layers comprising the thermoplastic acrylic copolymers of this invention contribute to abrasion resistance of the topcoat comprising the cured organopolysiloxane and adhesion between the polycarbonate formed article and the topcoat after the polycarbonate formed article is used for a long time. When the proportion of the alkyl acrylate in the alkyl methacrylate-alkyl acrylate copolymer becomes higher, abrasion resistance of the resulting coated aromatic polycarbonate formed article becomes lower. When the proportion of the alkyl acrylate in the alkyl methacrylate-alkyl acrylate copolymer becomes lower, adhesion between the topcoat and the polycarbonate substrate in the resulting polycarbonate formed article becomes weaker.

The average molecular weight of the thermoplastic acrylic copolymer, which is determined from top peak of gel permeation chromatograph, is critical, and generally the average molecular weight is above 50,000, preferably above 100,000. When the average molecular weight of the acrylic copolymer is below 50,000—for example, commercially available acrylic polymer having an average molecular weight of about 30,000 is used as a primer layer, the abrasion resistance of the resulting aromatic polycarbonate formed article is lowered remarkably. The acrylic copolymer having an average molecular weight of above 300,000 is not preferable, because the solution dissolving the acrylic copolymer having an average molecular weight of above 300,000 has extremely high viscosity and is poor in workability of coating it on the surface of an aromatic polycarbonate formed article to form a smooth primer layer.

Examples of the alkyl methacrylates include lower alkyl esters of methacrylic acid, such as methyl methacrylate, ethyl methacrylate, butyl methacrylate, etc. Examples of the alkyl acrylates include lower alkyl esters of acrylic acid, such as methyl acrylate, ethyl, acrylate, butyl acrylate, etc. Of the acrylic copolymers, the copolymers of methyl methacrylate butyl acrylate are preferable.

In the process of the present invention, the primer layer can be formed by the method comprising preparing a solvent solution of the acrylic copolymer as a primer coating solution, coating the solution on the surface of a polycarbonate substrate and drying the coating layer to remove the solvent and form a thin film of the acrylic copolymer.

The primer coating solution may be prepared by dissolving the acrylic copolymers in a solvent inert to an aromatic polycarbonate. Commercially available acrylic polymers having an average molecular weight of about 30,000 can be dissolved in many organic solvents. Acrylic copolymers having an average molecular weight of above 50,000 can be dissolved in methyl ethyl ketone, acetates, toluene, etc. which are capable of dissolving various polymers. However, these solvents also dissolve aromatic polycarbonates, so these solvents can not be used in the present invention as a solvent in preparing the primer coating solution.

The present inventors did research to overcome the above shortcoming. As a result, we found that a preferable process for primer coating can be carried out by the following method: The method comprises copolymerizing an alkyl methacrylate and an alkyl acrylate in ethylene glycol monoalkyl ether in which an aromatic polycarbonate is barely soluble, thereby obtaining solution of acrylic copolymer having desired average molecular weight in ethylene glycol monoalkyl ether, and coating the solution on the surface of an aromatic polycarbonate formed article.

Viscosity of the resulting acrylic copolymer solution may be adjusted by adding to the solution another solvents so long as the mixed solution might not dissolve an aromatic polycarbonate. The primary coating method as mentioned above is the preferred embodiment of the present invention.

In the process of the present invention there may be used the primer coating solutions prepared by the method which comprises copolymerizing an alkyl methacrylate and an alkyl arcylate in a solvent capable of dissolving the resulting acrylic copolymer, such as toluene, xylene, etc. and diluting the obtained solution of the acrylic copolymer with ethylene glycol monoalkyl ether.

The concentration of the acrylic copolymer in a primer coating solution may vary depending on primer coating workability, thickness of the primer layer, initiation of cracks in the topcoat, etc. In general, the concentration of the acrylic copolymer in a primer coating solution is profitably in the range of 10–30 wt%. In general, the thicker the primer layer, the greater the possibility of causing cracks in a topcoat layer. In addition when aromatic polycarbonate formed articles having a thick primer coat layer are used for a long time, the polycarbonate articles crack. Therefore, thickness of the primer coat is preferably in the range of 5–25 microns.

Thus, according to the above description, aromatic polycarbonate formed articles having excellent surface properties can be obtained by forming a primer layer comprised of the acrylic copolymer having a determined high molecular weight on the polycarbonate substrate, followed by forming a protective topcoat comprising a cured organopolysiloxane on the primer layer, whereby strong adhesion between the substrate and the topcoat can be accomplished.

The another main object of this invention is to provide polycarbonate formed articles which can be used outside of door for a long time, namely polycarbonate formed article having excellent weather resistance.

The present inventors found that weather resistance can be imparted to polycarbonate formed articles by having a primer layer and a topcoat absorb ultraviolet light so that more than 80% of ultraviolet light in the range of wave length of 300–380 milli micron does not reach the surface of the polycarbonate substrate. For such purpose it is necessary to use a considerable amount of ultraviolet light absorbents. Such a large amount of ultraviolet light absorbent cannot be incorporated in the coating composition for the topcoat.

In order to achieve the above purpose, an ultraviolet light absorbent in an amount of 10–20 wt% on the basis of weight of the acrylic copolymer should be incorporated in the primer layer in the present invention.

In general, when a large amount of an ultraviolet light absorbent is incorporated in the primer layer, there is possibility of deteriorating the primer layer itself or both the primer layer and the topcoat. However, when such a large amount of an ultraviolet light absorbent is incorporated in the acrylic copolymer employed in the present invention, such deterioration in the primer layer or the topcoat does surprisingly not occur. For example, when an ultraviolet light absorbent in an amount of 10–20 wt% is incorporated in the acrylic copolymer, abrasion resistance and adhesion to the substrate of the topcoat are not impaired and weather resistance is imparted to the polycarbonate formed articles.

The ultraviolet light absorbents employed in the present invention are selected from general purpose ultraviolet light absorbents belonging to benzotriazole series, benzophenone series or benzoate series. 2-(2'-Hydroxy-5'-tert.butylphenyl)benzotriazole is preferable. This compound is sold by Ciba Geigy AG under the trade name "Tinuvin PS".

Primer coating compositions for forming the primer layer may also optionally contain various flatting agents, surface active agents and thixotropic agents. All of these additives and the use thereof are well known in the art.

After the polycarbonate substrate has been primed by the application thereon of the primer coating composition and the evaporation of the solvent from the primer composition, a topcoat composition containing a further curable organopolysiloxane is applied onto the primed polycarbonate substrate. After the curable organopolysiloxane is coated on the primed polycarbonate article, the coated article is heated to obtain a topcoat comprising cured organopolysiloxane. The curable organopolysiloxanes used in the present invention include the hydrolysis reaction products of alkoxy silane compounds called a silicone-functional silane compound which are represented in the general formula:

$(R^5)_m Si(OR^6)_{4-m}$ wherein $R^5$ and $R^6$ is an alkyl group having $C_1$-$C_4$ and m is zero or a integer of 1 and 2. In general, any hydrolysis product of an alkyl trialkoxy silane may be used as a main component in the curable organopolysiloxane of the present invention. Hydrolysis products of other silane compounds may also be used with the above hydrolysis product. The product obtained by hydrolyzing a mixture of major amount of an alkyl trialkoxy silane, minor amount of a dialkyl dialkoxy silane and minor amount of a tetraalkoxy silane is preferable as a curable organopolysiloxane. The dialkyl dialkoxy silanes include, for example, dimethyl dimethoxy silane, dimethyl diethoxy silane, dimethyl dipropoxy silane, dimethyl dibutoxy silane, diethyl dimethoxy silane, diethyl dibutoxy silane, dipropyl dimethoxy silane, dipropyl diethoxy silane, dipropyl dibutoxy silane, etc. The alkyl trialkoxy silanes include, for example, methyl trimethoxy silane, methyl triethoxy silane, ethyl trimethoxy silane, propyl trimethoxy silane, propyl triethoxy silane, etc. The tetraalkoxy silanes include, for example, tetramethoxy silane, tetraethoxy silane, etc.

Hydrolysis of silicone-functional silane compounds can be carried out by well known methods. If desired, well known catalysts may be used for the hydrolysis.

The curable organopolysiloxane is dissolved in a well known solvent to form a topcoating composition.

As such a solvent may be mentioned a lower alcoholic compound such as methanol and ethanol; an ether compound such as ethylene glycol monoalkyl ether, tetrahydrofuran and dioxane; a ketone compound such as acetone and diethyl ketone; and an ester compound such as ethyl acetate. Such a solvent as tetrahydrofuran, a ketone compound and an ester compound should be preferably used in the mixture with a lower alcoholic compound, because it may dissolve the polycarbonate substrate and the primer layer. Curing catalysts for the organopolysiloxane, agents for improving the coating layer, smoothing agents, surfactants, or other additives can be incorporated in the topcoat composition containing the curable organopolysiloxane.

For example, the present process can be carried out by the following process: A primer composition containing an acrylic copolymer having specific average molecular weight and an ultraviolet light absorbent is coated on the aromatic polycarbonate formed article. The primed polycarbonate formed article is air-dried for several minutes, and then is dried at 70°-110° C., thereby forming a primer layer on the article. The primer coating can be carried out by well known methods, such as brushing, immersion, spraying, roll-coating, etc. Thereafter, a topcoating composition containing a curable organopolysiloxane is coated on the primer layer and is heated at 90°-130° C. for 30 minutes—4 hours to form cured organopolysiloxane layer thereon. The topcoating may be carried out by well known methods, such as brushing, immersion, spraying, roll coating etc.

The aromatic polycarbonate formed article employed in the present invention can include some articles, such as sheet, prepared by molding an aromatic polycarbonate resin which is obtained by reacting an aromatic divalent phenolic compound, such as bisphenol A, with a carbonate precursor, such as phosgene, by a well known process. The aromatic polycarbonate used in the present invention has recurring units of the formula:

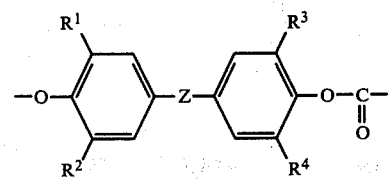

wherein $R^1$, $R^2$, $R^3$ and $R^4$ is one member selected from the group consisting of hydrogen, methyl, chlorine and bromine, and Z is a bridging member selected from the group consisting of a linear or branched alkylene group having $C_1$-$C_6$, a cyclohexylene group, an ether group, a thioether group and a sulfone group. The preferred polycarbonate may be derived from the reaction of bisphenol A and phosgene.

The aromatic polycarbonate should have an intrinsic viscosity of 0.3 to 1.0, preferably 0.45 to 0.65, measured at 25° C. in methylene chloride.

The coated polycarbonate formed article produced by the process of the present invention has good surface properties in that it has high wear resistance, chemical resistance, surface hardness and good contact between the primer layer and topcoat. In addition, the article does not yellow if it is left outdoors for an extended period, no crack is formed in the topcoat, and there is no decrease in the intimacy of contact between the topcoat and the primer layer. Therefore, the polycarbonate formed article according to the present invention has high weather resistance.

The process of the present invention is now described in greater detail by reference to the following reference examples, examples, and comparative run which are not intended to be taken as a limitation thereof. In these examples, unless otherwise noted, all parts are by weight.

The samples prepared in the examples were subjected to the following tests.

(1) Appearance

The appearance of the samples was checked visually on the basis of the following criterian:
O . . . good, Δ . . . cracks in the topcoat,
X . . . topcoat peeled off as time went by.

(2) Steel Wool Test

Steel wool (#0000) was held lightly against the surface of the topcoat and rubbed back and forth in 15 cycles. The wear resistance of each sample was evaluated on the following basis:
A' . . . no abrasion A . . . few abrasions
B . . . abrasions were observed, but the sample remained glossy.
C . . . great many abrasions caused loss of gloss.

(3) Adhesion Test

A hundred square notches (1 mm$^2$) were cut in the topcoat, and a Cellophane tape was applied over the cross-hatched area, and pulled off quickly at a right angle. The adhesion strength was evaluated by counting the number of unremoved squares. The best contact is expressed by 100/100.

(4) Weather Resistance Test

Each sample was placed in a sunshine carbon-arc accelerated weathermeter (Sunshine Weathermeter Model WE-SUN-HC of Suga Test Instruments Co., Ltd.), and subjected to the same tests as above.

Reference Example 1

255 Parts of methyl methacrylate and 45 parts of n-butyl acrylate were dissolved in 300 parts of ethylene glycol monoethyl ether to form a solution. The solution was charged into a four-necked flask equipped with reflux condenser, agitator and thermometer. 1.5 Parts of benzoyl peroxide was added to the mixture. The solution was gradually heated with stirring under a nitrogen atmosphere and the polymerization was carried out at 80°–85° C. for 5 hours with stirring. Average molecular weight of the acrylic copolymer obtained by the polymerization was determined from top peak in a gel permeation chromatograph. The average molecular weight thereof was 120,000.

Reference Example 2

136 Parts of methyl trimethoxy silane, 26 parts of tetramethoxy silane, 15 parts of dimethyl dimethoxy silane, 124 parts of isopropyl alcohol and 25 parts of glacial acetic acid were blended. The resulting solution was cooled by ice and was maintained at 5° C. Hydrolysis of these silanes was carried out while adding dropwise 62 parts of 0.01 normal hydrochloric acid to the solution. The hydrolysis reaction was an exothermic reaction, so the rate of addition was adjusted, so that the temperature of the solution did not exceed 30° C. After all the hydrochloric acid was added, the mixture was continuously stirred at room temperature for an additional 4 hours.

To the resulting reaction product were added 0.6 parts of anhydrous sodium acetate, 6 parts of pure water and 55 parts of isopropyl alcohol. The mixture was stirred for an additional 3 hours.

To the resulting reaction product were added 0.2 parts of fluorine type surfactant ("FC-430" produced by Sumitomo 3 M) and 3.5 parts of polyvinyl butyral resin ("S-LEC BM-1", produced by Sekisui Chemical Co., Ltd.). The resulting mixture was stirred for an additional 12 hours. The resulting product was allowed to stand for one week for aging the product to obtain a topcoating composition.

EXAMPLE 1

Solution of acrylic copolymers of an average molecular weight of 50,000; 100,000; 200,000 and 300,000 were prepared according to the process of Reference Example 1, respectively. Each of the resulting solutions of acrylic copolymers was so diluted with ethylene glycol monoethyl ether as to obtain acrylic copolymer solution having concentration of 15%. Silicone type levelling agent ("BYK-300" produced by BYK-Mallincrodt) in amount of 0.1% on the basis of weight of the acrylic copolymer was added to each of the acrylic copolymer solutions in order to improve smoothness of the primer coating layer. It was used as the primer coating composition.

Each of the resulting primer coating compositions was coated on an aromatic polycarbonate resin sheet by bar coater so that thickness of the primer layer amounted to 20 microns. The primer coatings were air-dried for 10 minutes and then dried at 100° C. for 30 minutes in an oven with internal air circulation.

The topcoating composition prepared by Reference Example 2 was coated on each of the primed sheets by the immersion method.

Thereafter, the coated sheets were air-dried for 10 minutes and then heated at 120° C. for 4 hours in an oven with internal air circulation to form a cured top coat.

Surface properties of the resulting polycarbonate resin sheets are shown in Table 1.

TABLE 1

| Average molecular weight of acrylic copolymer | Appearance | Steel wool test | Adhesion |
| --- | --- | --- | --- |
| 50,000 | O | B | 100/100 |
| 100,000 | O | A' | 100/100 |
| 200,000 | O | A' | 100/100 |
| 300,000 | O | A' | 100/100 |

For comparison, the procedure of Example 1 was repeated except that a commercially available acrylic polymer (average molecular weight of about 30,000) was used as a primer layer. The surface properties of the resulting polycarbonate resin sheet were evaluated. The results are as follows:
Steel wool test: B–C
Adhesion: 0/100–20/100
Its surface properties were poor.

EXAMPLES 2–6 and Comparative Run 1

Various acrylic copolymers were prepared by changing the ratio of methyl methacrylate (MMA) to butyl acrylate (BA) according to the process of Reference Example 1. The average molecular weight of these acrylic copolymers was in the range of 120,000–150,000. Each of the acrylic copolymers was diluted with ethylene glycol monoethyl ether so that concentration of the acrylic copolymer in the solutions amounted to 15%. 2-(2'-Hydroxy-5'-tert.-butylphenyl)-benzotriazole ("Tinuvin PS" produced by Ciba Geigy AG) in amount of 20% and silicone type levelling agent (BYK-300) in amount of 0.1%, on the basis of weight of the acrylic copolymer, were added to each of the acrylic copolymer solutions to obtain primer coating compositions.

Each of the primer coating compositions was coated on an aromatic polycarbonate resin sheet by immersion method, and dried at 100° C. for 30 minutes to form primer layer of 10–15μ thick on the sheet.

The topcoating composition prepared by Reference Example 2 was coated on each of the primed sheets by the immersion method, and heated at 120° C. for 4 hours to form a cured top coat. Surface properties of the resulting polycarbonate resin sheet are shown in Table 2.

For comparison, the procedure of Examples 2-6 was repeated except that a homopolymer of MMA was used as a primer layer. After the weather resistance test was carried out, adhesion of the coating layer was lowered remarkably.

"Tinuvin PS" is incorporated in the acrylic copolymer, abrasion resistance and adhesion of the resulting polycarbonate resin sheet are good. This is the feature which the aromatic polycarbonate resin sheet prepared according to the present invention has.

TABLE 2

| Ex. and comp. run | Ratio of MMA/BA | initial properties steel wool test | adhesion | adhesion after weather resistance test hours for which weather resistance test was carried out | | | |
|---|---|---|---|---|---|---|---|
| | | | | 500 hrs | 1000 hrs | 1500 hrs | 2000 hrs |
| comp. run 1 | 100/0 | A' | 100/100 | 0/100 | — | — | — |
| Ex. 2 | 90/10 | A' | 100/100 | 100/100 | 100/100 | 100/100 | 100/100 |
| Ex. 3 | 85/15 | A' | 100/100 | 100/100 | 100/100 | 100/100 | 100/100 |
| Ex. 4 | 80/20 | A' | 100/100 | 100/100 | 100/100 | 100/100 | 100/100 |
| Ex. 5 | 75/25 | A | 100/100 | 100/100 | 100/100 | 100/100 | 100/100 |
| Ex. 6 | 70/30 | A | 100/100 | 100/100 | 100/100 | 100/100 | 100/100 |

TABLE 3

| Ex. and comp. run | amount of "Tinuvin PS" add (%) | Initial properties | | Properties after weather resistance test | | | | | |
|---|---|---|---|---|---|---|---|---|---|
| | | steel wool test | adhesion | 1000 hrs | | | 2000 hrs | | |
| | | | | appearance | yellowing | adhesion | appearance | yellowing | adhesion |
| comp. run 2 | 0 | A' | 100/100 | X | great | 0/100 | — | — | — |
| Ex. 7 | 2 | A' | 100/100 | Δ | some | 50/100 | x ~ Δ | great | 0/100 |
| Ex. 8 | 5 | A' | 100/100 | O | slight | 100/100 | Δ | some | 50/100 |
| Ex. 9 | 10 | A' | 100/100 | O | no | 100/100 | O | no | 100/100 |
| Ex. 10 | 15 | A' | 100/100 | O | no | 100/100 | O | no | 100/100 |
| Ex. 11 | 20 | A' | 100/100 | O | no | 100/100 | O | no | 100/100 |
| Ex. 12 | 30 | A' | 50/100 | O | no | 50/100 | O | no | 50/100 |

EXAMPLES 7-12 and Comparative Run 2

Into a 3 liter four-necked flask equipped with reflux condenser, agitator and thermometer were charged 410 parts of MMA, 90 parts of BA, 500 parts of ethylene glycol monoethyl ether and 1.5 parts of azo-bis-isobutylonitrile. The mixture was heated at 80°-85° C. under a nitrogen atmosphere with stirring. After 3 hours, 1.0 parts of azo-bis-isobutylonitrile was added to the mixture. The mixture was heated for additional 2 hours with stirring to obtain acrylic copolymers having an average molecular weight of 150,000.

The resulting solution of the acrylic copolymer was diluted with mixed solvent of ethylene glycol monomethyl ether/meta-xylene/isopropyl alcohol (ratio of 1.2/0.8/1.5) to obtain a 15% acrylic copolymer solution. Silicone type levelling agent (BYK-300) in amount 0.1% on the basis of weight of acrylic copolymer was added to the solution.

Ultraviolet light absorbent ("Tinuvin PS") in amount of 2, 5, 10, 15, 20 or 30% on the basis of weight of acrylic copolymer was added to the acrylic copolymer solution, respectively.

Each of the resulting primer coating compositions was coated on an aromatic polycarbonate resin sheet by bar coater so that thickness of the primer layer amounted to 10μ and heated at 100° C. for 30 minutes.

The topcoating composition prepared by Reference Example 2 was coated on each of the resulting primed polycarbonate resin sheets by the immersion method and heated at 120° C. for 4 hours to obtain a cured topcoat. The surface properties of the resulting polycarbonate resin sheet are shown in Table 3.

It would be understood from Table 3 that use of large amount of ultraviolet light absorbent is necessary for obtaining an aromatic polycarbonate resin sheet having excellent weather resistance. Even if a large amount of

What is claimed is:

1. In a process for producing a coated aromatic polycarbonate formed article having improved surface properties which comprises:
   forming a primer layer containing a thermoplastic acrylic copolymer and an ultraviolet light absorbent on an aromatic polycarbonate formed article, and
   forming a protective topcoat comprising a thermoset organopolysiloxane on said primed polycarbonate article, the improvement characterized in that said acrylic copolymer is a copolymer of an alkyl methacrylate and an alkyl acrylate having an average molecular weight of above 50,000, determined from top peak in gel permeation chromatograph.

2. The process of claim 1, wherein the amount of said ultraviolet absorber employed is in the range of 10–20 wt% on the basis of weight of said thermoplastic acrylic copolymer.

3. The process of claim 2 wherein said ultraviolet light absorbent is 2-(2'-hydroxy-5'-tert.-butylphenyl)-benzotriazole.

4. The process of claim 1 wherein said thermoplastic acrylic copolymer is a copolymer of methyl methacrylate and butyl acrylate.

5. The process of claim 1 wherein for forming the primer layer is used a primer coating solution prepared by a method which comprises copolymerizing an alkyl methacrylate and an alkyl acrylate in ethylene glycol monoalkyl ether.

6. The process of claim 1 wherein said thermoset organopolysiloxane is derived from curing a hydrolysis reaction product obtained by hydrolyzing a mixture of major amount of an alkyl trialkoxy silane, minor amount of a dialkyl dialkoxy silane and minor amount of a tetraalkoxy silane.

* * * * *